United States Patent [19]
Mizuno

[11] Patent Number: 4,704,637
[45] Date of Patent: Nov. 3, 1987

[54] IMAGE PROCESSING APPARATUS

[75] Inventor: Yoshio Mizuno, Tokyo, Japan

[73] Assignee: Canon Kabushiki Kaisha, Tokyo, Japan

[21] Appl. No.: 873,805

[22] Filed: Jun. 12, 1986

[30] Foreign Application Priority Data

Jun. 21, 1985 [JP] Japan .................. 60-136707
Oct. 3, 1985 [JP] Japan .................. 60-220754

[51] Int. Cl.⁴ ............................................. H04H 1/40
[52] U.S. Cl. .................................. 358/780; 358/282
[58] Field of Search ............... 358/280, 282, 284, 293; 356/299; 200/578

[56] References Cited

U.S. PATENT DOCUMENTS

| | | | |
|---|---|---|---|
| 4,257,070 | 3/1981 | Sommer et al. | 358/282 |
| 4,272,789 | 6/1981 | Birom | 358/282 |
| 4,567,527 | 1/1986 | Yokomizo | 358/282 |
| 4,578,711 | 3/1986 | White et al. | 358/282 |
| 4,584,703 | 4/1986 | Hallberg | 358/282 |

FOREIGN PATENT DOCUMENTS

3237393C2  4/1983  Fed. Rep. of Germany .
2001825A   2/1979  United Kingdom .

OTHER PUBLICATIONS

"Chromagraph 399-der neue Multicolor-Scanner mit Laser", with partial translation.

Primary Examiner—Edward L. Coles, Sr.
Attorney, Agent, or Firm—Fitzpatrick, Cella, Harper & Scinto

[57] ABSTRACT

In an image processing apparatus, an A/D converter converts an input image signal to a digital image signal. A comparator compares a threshold level from a CPU with the input digital image signal and processes the digital image signal in a normal mode, or in a NEG/-POS (negative/positive) reversal mode for reversing the image density. The CPU selectively sends different threshold levels to determine the operation mode of the comparator.

17 Claims, 14 Drawing Figures

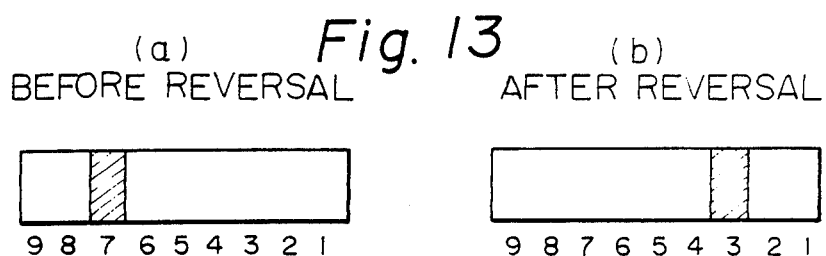
Fig. 13 (a) BEFORE REVERSAL  (b) AFTER REVERSAL
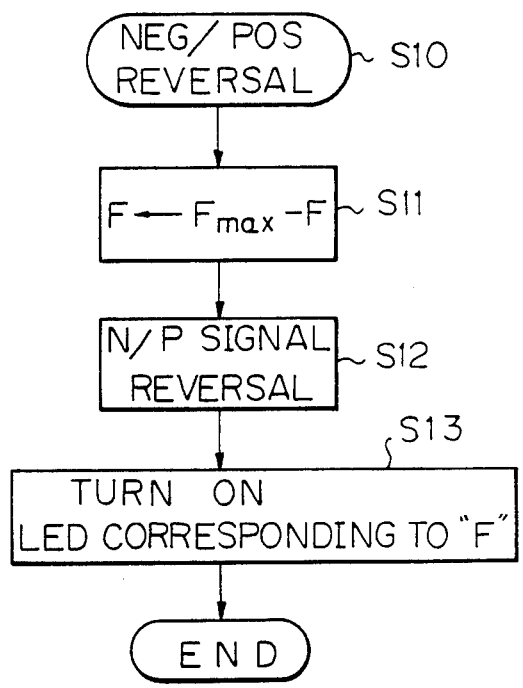
Fig. 14

IMAGE PROCESSING APPARATUS

BACKGROUND OF THE INVENTION

The present invention relates to an image processing apparatus for performing image processing such as quantization of an image signal input to a digital copying machine or a facsimile system, and outputting the processed image signal.

Conventional copying machines and facsimile systems aim at simply copying and transmitting an original with good reproductivity.

It is also known to represent the density of an original image by an electrical binary signal.

In order to change a density of an image to be copied, a slice level serving as a binary reference for the analog image signal is changed according to an instruction from an operator. As shown in FIG. 1, when an operator adjusts a density control mechanism to cause it to set an output image level at a high density level, a low slice level TL2 is used to digitize an image signal IS. However, if the output image level is set at a low density level, a high slice level TL1 is used. As shown by waveforms (2) and (3) in FIG. 1, a binary black level output signal has a narrow duration when the high slice level TL1 is used, as compared with the case wherein the low slice level TL2 is used. As a result, the density of the output image is decreased.

Along with the use of digital image signals and the development of digital processing, negative/positive (NEG/POS) reversal can be achieved by inverting the binary image signal. With NEG/POS reversal, a positive original image is converted to a negative image and vice versa, and the converted image is output.

Conventional slice level setting for NEG/POS conversion poses the following problem.

As shown in FIG. 2, if an output (2) obtained by inverting the binary image output according to the use of the high slice level TL1 when the density control mechanism causes the output signal level to be set at the low density level is compared with an output (3) obtained by inverting the binary image output according to the use of the low slice level TL2 when the density control mechanism causes the output signal level to be set at the high density level, the binary black level output signal (2) has a wider duration than that of the output (3). Therefore, an output of a high density appears as the output signal (2), even though the operator desires a low image density.

If identical setting is performed with and without NEG/POS reversal, the density output desired by the operator cannot be obtained. Therefore, the operator must perform density setting in accordance with the operation mode.

SUMMARY OF THE INVENTION

The present invention has been made in consideration of the above situation, and has as its object to provide an image processing apparatus for outputting an image output of a desired density.

It is another object of the present invention to provide an image processing apparatus for providing an image signal suitable for a set mode.

It is still another object of the present invention to provide an image processing apparatus wherein an image output of a desired density corresponds to the image density set by the operator, regardless of NEG/POS reversal.

It is still another object of the present invention to provide an image processing apparatus for performing desired image processing even if the NEG/POS mode is switched.

The above and other objects, features, and advantages of the present invention will be apparent from the following detailed description, taken in conjunction with the accompanying drawings.

BRIEF DESCRIPTION OF THE DRAWINGS

FIGS. 13(a) and 13(b) are plan views respectively showing the "before reversal" and "after reversal" states of a density level display; and FIG. 14 is a flow chart for explaining a mode change operation.

DETAILED DESCRIPTION OF THE PREFERRED EMBODIMENTS

Figure 3:
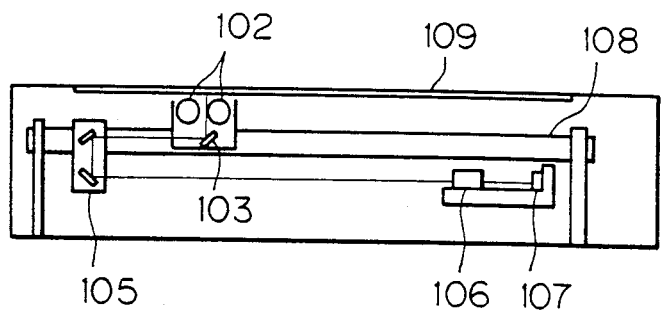
FIG. 3 is a schematic view of an image reading device for photoelectrically reading an original image.

FIG. 3 is a schematic view of an image reading device which can employ the present invention.

An original facing down on an original table 109 is illuminated with fluorescent lamps 102. Light reflected by the original is focused as an original image on a CCD 107 for reading one line of image through reflecting mirrors 103 and 105 and an optical lens 106, thereby achieving reading along the main scanning direction. The fluorescent lamps 102 and the reflecting mirrors 103 and 105 are moved along a guide rail 108 to scan the original, thereby reading the image in the subscanning direction. The CCD 107 has a plurality of photoelectric transducer elements and converts a density of the original image to an analog electrical signal.

Figure 4:
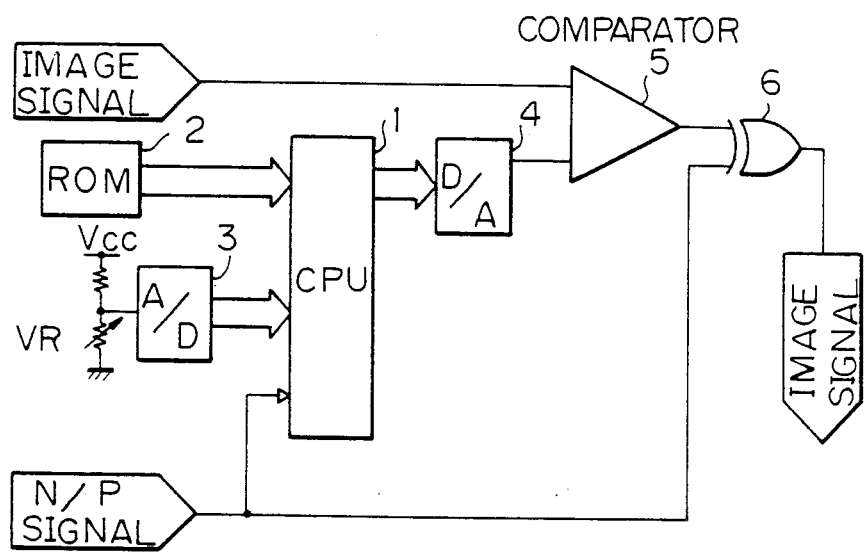
FIG. 4 is a block diagram of an image processing apparatus according to an embodiment of the present invention.

FIG. 4 shows an image processing apparatus, for processing an analog image signal output from the CCD 107 in FIG. 3, according to an embodiment of the present invention. The image processing apparatus includes a microcomputer (CPU) 1, a read-only memory (ROM) 2, a variable resistor VR, an A/D converter 3, a D/A converter 4, a comparator 5, and an exclusive OR gate 6. The CPU 1 performs slice level processing and the like. The ROM 2 stores control programs for the CPU 1. The variable resistor VR adjusts a slice level so as to change the image density. The A/D converter 3 converts an output from the variable resistor VR to a digital signal, and supplies the current density level to the CPU 1. The D/A converter 4 converts the digital slice level value from the CPU 1 to an analog slice level. The comparator 5 compares the analog slice level from the D/A converter 4 with the analog image signal from the image reading device (FIG. 3) to form a binary image signal.

Figure 5:
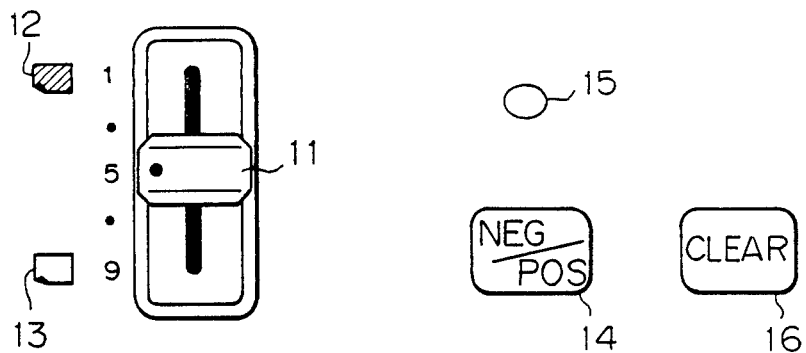
FIG. 5 is a schematic plan view showing a density setting section.

FIG. 5 shows the overall arrangement of the density setting section in the apparatus which allows the operator to shift the variable resistor VR. The density setting section includes a density setting lever 11. The operator can move the lever 11 to change the resistance of the variable resistor VR. As is apparent from FIG. 5, numerals 1,5,9 and marks 12 and 13 representing illustrative image density level are printed along the moving direction of the lever 11. If the operator moves the lever 11 toward numeral 1 (i.e., the mark 12), the output image density is increased. However, if the operator moves the lever 11 toward numeral 9 (i.e., the mark 13), the output image density is decreased.

The density setting section also includes a mode key 14 for designating execution of NEG/POS reversal, and a clear key 16 for canceling designation of the MEG/POS reversal. If the mode key 14 is operated, the NEG/POS reversal mode is set and an indicator 15 is turned on.

When the mode key 14 is operated to select the NEG/POS reversal mode, a signal N/P in FIG. 4 is set at high (H) level. The signal N/P is supplied to the CPU 1 and the exclusive OR gate 6.

Figure 6:
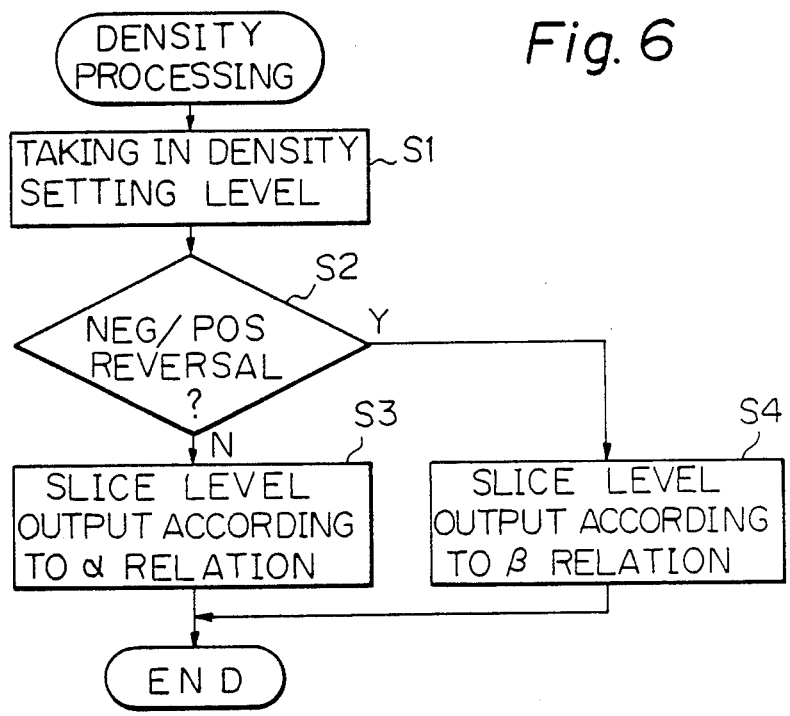
FIG. 6 is a flow chart for explaining slice level decision procedures.
Figure 7:
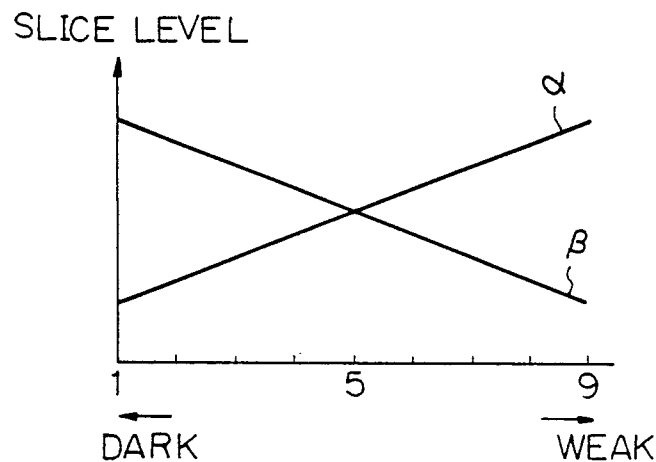
FIG. 7 is a graph showing the slice level as a function of image density set by the operator.

FIG. 6 shows the operation sequence for determining the slice level in the CPU 1 of FIG. 4. The operation sequence is programmed in the ROM 2 in advance. FIG. 7 shows the relationship between the slice levels and the set densities.

The operation of the circuit in FIG. 4 will be described with reference to the flow chart in FIG. 6.

The normal mode free from the NEG/POS reversal operation will be described first. In the normal mode, the signal N/P is set at low (L) level.

The CPU 1 fetches, through the A/D converter 3, the density level value set by the variable register VR (S1). Since the signal N/P is set at L level, the CPU 1 determines that the normal mode is set (S2). The slice level corresponding to the density level value fetched in step S1 is determined according to the relationship represented by line α in FIG. 7. The determinedslice level is supplied to the comparator 5 through the D/A converter 4 (S3). In the normal mode, when a high (i.e., dark) output density is set by the operator, the CPU 1 sends the low slice level to the comparator 5. However, if a low (i.e., light) output density is set, the CPU 1 supplies the high slice level to the comparator 5.

After the slice level is set, the original reading device in FIG. 3 starts reading of an original image using an image sensor such as a CCD to generate an analog original image signal corresponding to the original image density. The analog image signal is supplied to the comparator 5 and is compared with the slice level set as described above. The analog image signal is then converted to a binary image signal representing black as "1" and white as "0".

The binary image singal from the comparator 5 is supplied to the exclusive OR gate 6. In the normal mode, the signal N/P is set at low level. The binary image signal is gated as the image signal through the exclusive OR gate 6, and the output from the gate 6 is supplied to a printer (not shown) and printed as an image on printing paper.

The NEG/POS reversal mode for executing NEG/POS reveral is set upon operation of the mode key 14. In this mode, the signal N/P is set at H level.

The CPU 1 fetches, through the A/D converter 3, a density level value set by the variable resistor VR in the same manner as in the normal mode (S1). Since the signal N/P is set at H level, the CPU 1 determines that the NEG/POS reversal mode is set (S2). The slice level corresponding to the density level fetched in step S1 is determined by the CPU 1 according to the relationship represented by line β in FIG. 7. The determined slice level is then supplied to the comparator 5 through the D/A converter 4 (S4).

In the NEG/POS reversal mode, if the operator sets a high output density, the CPU 1 sends the high slice level to the comparator 5. However, if the operator sets a low output density, the CPU 1 sends the low slice level to the comparator 5. The different slice levels (excluding density level 5 of the lever 11) are generated for the outputs from the variable resistor VR in the normal and NEG/POS reversal modes, as shown in FIG. 7.

If the slice level is determined in the NEG/POS reversal mode, the original reading device in FIG. 3 starts reading of the original image and generates an analog image signal. The analog image signal is supplied to the comparator 5 and compared with the corresponding slice level, and is converted to a binary image signal representing black as "1" and white as "0".

The binary image signal output from the comparator 5 is supplied to the exclusive OR gate 6. In the NEG/POS reversal mode, since the signal N/P is set at H level, the binary image signal input to the exclusive OR gate 6 is inverted. Therefore, the NEG/POS reversl operation is performed. The inverted binary image signal is supplied to and printed at the printer. As a result, the NEG/POS reversed image can be printed.

Figure 8:
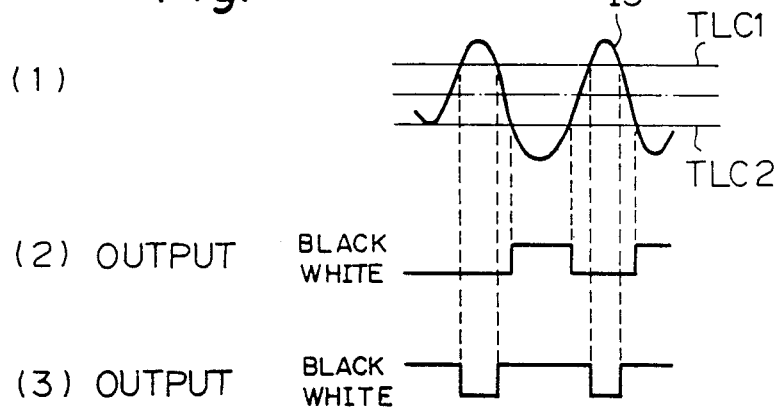
FIG. 8 is a timing chart showing digitization of the arrangement in FIG. 4.

FIG. 8 shows an output state showing an image signal IS processed by the processor in FIG. 4. When the operator sets an output image of a high density with the variable resistor VR, a high slice level TLC1 is output from the CPU 1. Otherwise, the CPU 1 outputs a low slice level TLC2.

Figure 1:
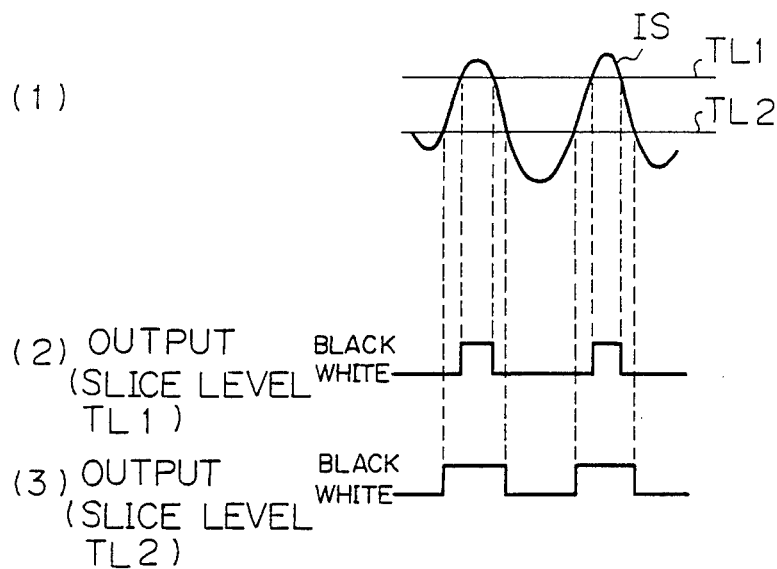
FIGS. 1 and 2 respective timing charts for explaining conventional analog signal digitization techniques.
Figure 2:
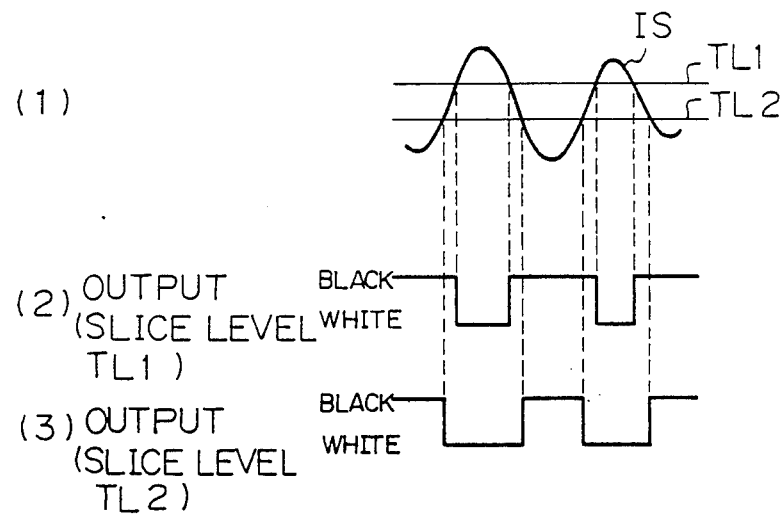

The slice levels TLC1 and TLC2 can be used to digitize the image signal IS. The resultant binary image signals are shown as outputs (2) and (3) in FIG. 8. As is apparent from FIG. 8, the pulse width of the black level of the binary image signal is changed in accordance with the density set by the variable resistor VR (i.e., the lever 11). Unlike the conventional technique (FIG. 2), the output image densities are not reversed. Therefore, the operator can set the density regardless of the operation mode, i.e., the normal mode or the NEG/POS reversal mode. In either mode, the same procedures can be performed using the lever 11 so as to obtain an image output of a desired density.

Figure 9:
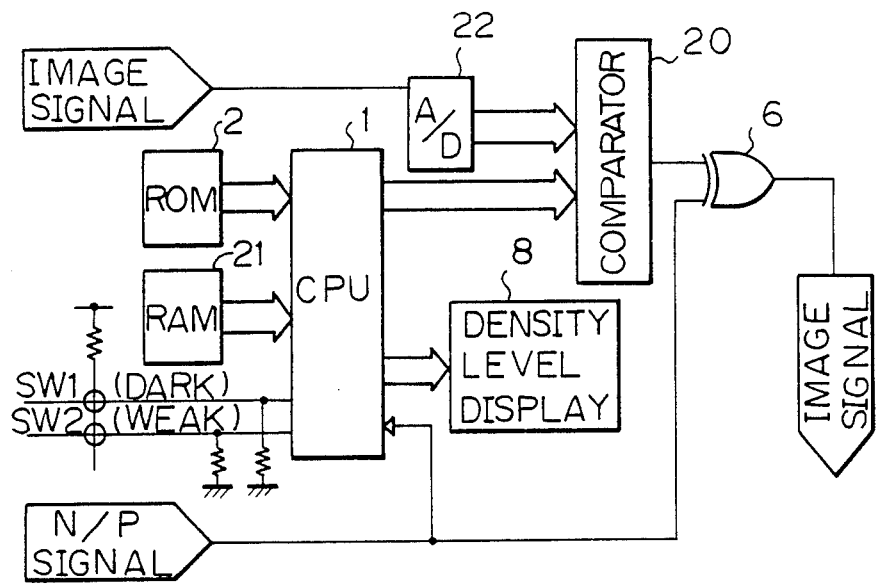
FIG. 9 is a block diagram of an image processing apparatus according to a second embodiment of the present invention.

FIG. 9 shows a second embodiment of the present invention, exemplified by partially changing the previous arrangement. A key switch or the like is arranged in place of the variable resistor VR in the slice level control section. More specifically, a dark image output setting switch SW1 and a light image output setting switch SW2 are arranged in the slice level control section. A desired density level can be set using these switches. A memory (RAM) 21 is also arranged to store a level set by selectively using these switches. In addition, a display 8 is provided to display a density level according to the content of the RAM 21. A digital comparator 20 is used in place of the analog comparator 5 for converting the analog image signal into the binary signal. The analog image signal from the image reading device is converted by an A/D converter 22 into a digital image signal having a predetermined number of bits. The digital image signal is compared by the digital comparator 20 with the digital slice level, thereby obtaining a binary image output.

In the arrangement of FIG. 9, the CPU 1 descriminates the mode according to the status of the signal N/P, and the slice level is selected according to mode setting. In either the normal mode or the NEG/POS reversal mode, an image output of a desired density can be obtained upon operation of the switch SW1 or SW2.

In the above description, the image signal from the original reading device (e.g., a facsimile system or a digital copying machine) is converted to the binary signal. However, the present invention can also be applied to reading of an image recorded on a film such as microfilm. If there are two types of film (microfilm) available, i.e., negative and positive films, the NEG/POS reversal operation is effective. Digitization need not be limited to the case using the fixed slice levels of the image signal. Digitization utilizing dither processing for reproducing a pseudo halftone image can be used. In this case, the slice levels constituting the dither patterns according to the normal and NEG/POS reversal modes can be changed. The present invention can also be applied to other quantization schemes such as three-value quantization.

As described above, there is provided a convenient image processing device wherein the image of a desired density specified by the operator can be obtained regardless of the normal or NEG/POS reversal mode, and density preset errors can be reduced.

In the above embodiment, the analog image signal of high level is represented by the black level and the analog image signal of low level is represented by the white level. The black level corresponds to logic "1", and the white level corresponds to logic "0". However, the relationship between the levels and the image densities is not limited to that defined in the above embodiment. For example, an analog image signal of high level can be represented by the white level, and an analog image signal of low level can be represented by the black level. The slice level values and the density increase/decrease direction can be changed according to the relationship between the levels and the time densities.

With the arrangement described above, the CPU 1 can automatically determine a slice level suitable in a desired preset level regardless of the normal or NEG/POS reversal mode. Assume that a positive image is output according to an image density specified at the density control section, and that a desired image output is obtained. Also assume that the operator performs NEG/POS reversal so as to obtain a negative image output. In this case, the threshold level is changed to the negative image reading level according to the NEG/POS reversal instruction and the output image density is thus changed. Therefore, the operator must specify a negative mode threshold value at the density control section.

In order to eliminate the above inconvenience, an image processing apparatus for processing an image according to a desired threshold level, even if NEG/POS reversal is performed, will be described below.

Figure 10:
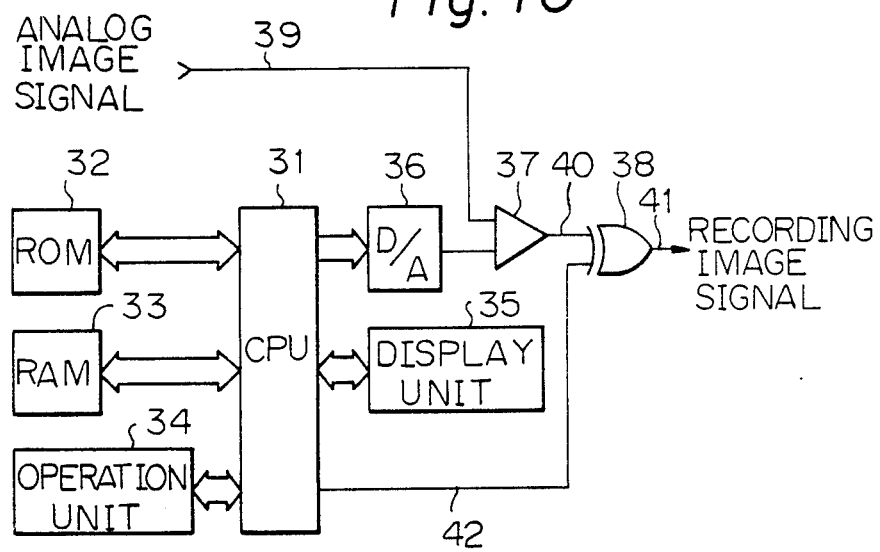
FIG. 10 is a block diagram of an image processing apparatus according to a third embodiment of the present invention.

FIG. 10 is a block diagram of an image processing apparatus according to a third embodiment of the present invention.

A controller (CPU) 31 controls the operation of the respective blocks in FIG. 10. The CPU 31 comprises a known microcomputer. A memory ROM 32 stores an operation program for the CPU 31 and threshold data. A memory RAM 33 stores different types of data during the operation of the apparatus. An operation panel 34 is used by the operator to specify a desired image density and the negative/positive read mode. A display unit 35 displays the image processing contents according to data or the like input at the operation panel 34. An A/D converter 36 converts a digital threshold signal from the CPU 31 to an analog value, and determines a binary threshold level for the image signal. A comparator 37 compares the threshold level from the A/D converter 36 with an analog image signal 39 from the image reading device in FIG. 3, and generates a binary image signal 40. An exclusive OR gate 38 outputs the binary signal from the comparator 37 without modification or with an inverted polarity. An output 41 from the exclusive OR gate 38 is supplied as a recording image signal to a printer.

With the above arrangement, a recording image signal 41 of logic "1" represents the black level and a recording image signal 41 of logic "0" represents the white level. The comparator 37 outputs a black image analog signal at logic "1" and a white image analog signal at logic "0". If the operator designates the positive reading mode, the CPU 31 sets an N/P (negative/positive) signal 42 at logic "0". The binary signal from the comparator 37 is output to the exclusive OR gate 38 without modification. However, if the negative read mode is specified, the CPU 31 sets the N/P signal 42 at level "1". The polarity of the binary signal from the comparator 37 is then inverted, and the inverted output is gated through the exclusive OR gate 38.

Figure 11:
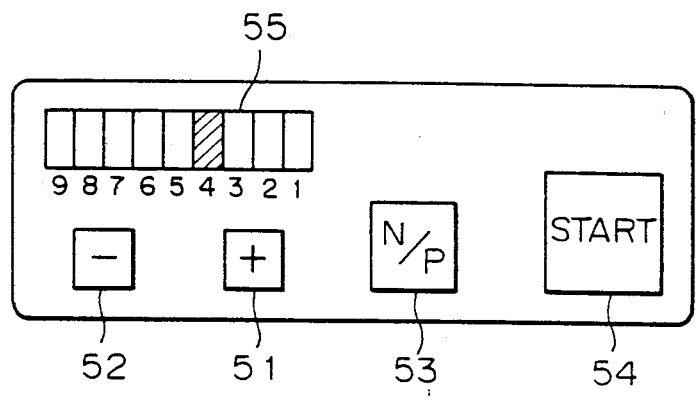
FIG. 11 is a schematic plan view showing an operation panel and a display unit.

FIG. 11 shows the operation panel 34 and the display unit 35. The operation panel 34 includes a plus key 51 and a minus key 52. The plus key 51 is depressed to increase the density of the image output, and the minus key 51 is depressed to decrease the density of the image output. A density level display 55 consists of nine LEDs to show one of the nine density levels. Upon depression of the plus key 51, the light-emitting LED position is shifted to the right in FIG. 11. However, depression of the minus key 52 causes shifting of the light-emitting LED position to the left. The LED located at a hatched position 4 is currently on.

The operation panel also includes a NEG/POS reversl key 53. If the operator depresses the NEG/POS reversal key 53, the currently set mode is updated to another mode. The NEG/POS reversal key 53 incorporates an LED. If the NEG mode is set, the LED is lit. However, in the POS mode, the LED is turned off. A start key 54 specifies the start of image reading or writing.

Figure 12:
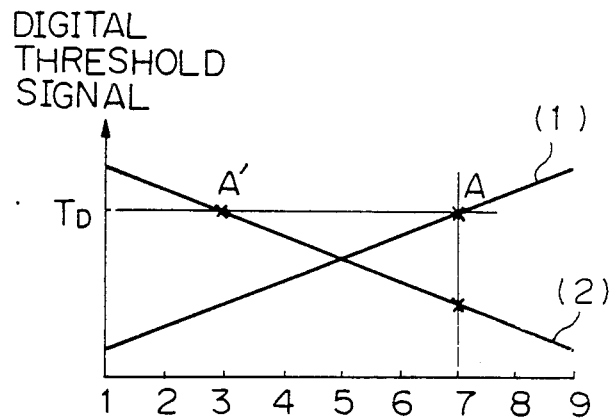
FIG. 12 is a graph for explaining a digital threshold setting operation.

The digital threshold value determination by the CPU 31 will be described with reference to FIG. 12. In FIG. 12, the display position of the density display 55 is plotted along the abscissa and the level of the digital threshold signal from the CPU 31 to the D/A converter 36 is plotted along the ordinate. For the sake of simplicity, changes in threshold signal are represented by analog values. Lines (1) and (2) represent relationships between the display positions of the density display 55 and the digital threshold signals derived by positive and negative read operations.

Assume that the operator designates the POS read mode with the NEG/POS reversal key 53, and that density 7 is set using the plus and minus keys 51 and 52, as shown in FIG. 13(a). The CPU 31 calculates a digital threshold signal TD from threshold data stored in the ROM 32, i.e., from an intersection A corresponding to the density 7 in the POS read mode. The digital threshold signal TD is sent to the D/A converter 36. In this case, the N/P signal 42 is set at logic "0".

In this state, if the operator depresses the start key 54, the analog image signal from the image reading device is digitized according to a threshold level TL corresponding to the digital threshold signal TD. The binary signal is then supplied to the printer. The original image is thus reversed, and the reversed image is reproduced.

If the operator depresses the NEG/POS reversal key 53, the POS read mode is updated to the NEG read mode and the built-in LED in the NEG/POS reversal key 53 is turned on. In this case, the CPU 31 calculates an intersection A' on the NEG read line (2) according to the digital threshold signal TD obtained prior to operation of the NEG/POS reversal key 53. The display position of the density level display 55 is then calculated according to this digital threshold signal TD. Thus, the display position of the density level display 55 is changed from the state in FIG. 13(a) to that in FIG. 13(b). Therefore, the N/P signal 42 is set at logic "1".

While the level of the digital threshold signal TD set in the POS read mode, the read mode is updated to the NEG read mode, whose level corresponds to that of the POS mode. At the same time, the display of the density level display 55 is updated according to the MEG mode.

The operation sequence of read mode updating in the CPU 31 (FIG. 10) is shown in FIG. 14. This operation sequence is prestored in the ROM 32.

The sequence in FIG. 14 will be described below. If the NEG/POS reversal key 53 in the operation panel 34 is operated (S10), the CPU 31 subtracts a value representing a current LED display position F from a value Fmax (=10 in this embodiment) obtained by adding 1 to the total number (9 in this embodiment) of LEDs of the density level display 55. The updated value is defined as the LED display position F after the mode change (S11). The polarity of the NEG/POS signal 42 is then inverted (S12), and the LED corresponding to the updated LED display position F is turned on (S13).

In the above embodiment, the POS read mode is updated to the NEG read mode. However, similar operations are performed in mode updating from the NEG reading mode to the POS read mode. The image signal input to the circuit in FIG. 10 is not limited to the analog image signal from the image reading device. In this case, the comparator 37 is replaced with a digital comparator. Digital threshold data is supplied from the CPU 31 to the digital comparator to digitize the digital image input. The present invention can also be applied to output to processing of a wordprocessor or a computer in addition to processing of signals from the image reading device. In addition, the output devices are not limited to the printers, but can be an image file with a magnetooptical disk.

As described above, the threshold level prior to mode updating can be retained even if the mode is updated from the NEG to the POS mode and vice versa. The output image density does not change, and good image processing can be achieved.

What is claimed is:
1. An image processing apparatus comprising:
   means for quantizing an input image signal;
   means for processing the image signal quantized by said quantizing means, said processing means being operable in either a first processing mode for reversing a density level of the image and outputting reversed image, or a second processing mode for outputting the image without reversing the level thereof; and
   control means for controlling different quantization operations of said quantizing means in the first and second processing modes.

2. An apparatus according to claim 1, further comprising means for selecting one of the first and second processing modes.

3. An apparatus according to claim 1, wherein said control means controls different threshold values used in quantization of said quantizing means in a selected one of the first and second processing modes.

4. An apparatus according to claim 1, wherein said quantizing means quantizes an image signal obtained upon reading of an original image.

5. An image processing apparatus comprising:
   means for quantizing an input image signal according to a given threshold value;
   means for setting a desired image density;
   means for processing an image signal quantized by said processing means, said processing means being operable in either a first processing mode for reversing a density level of the image and outputting a reversed image, or a second processing mode for outputting the image without reversing the level thereof; and
   means for supplying, to said quantizing means, a threshold value variable according to a density set by said setting means, said supplying means being adapted to use different threshold values according to the density set by said setting means in the first and second processing modes.

6. An apparatus according to claim 5, further comprising means for selecting one of the first and second processing modes.

7. An apparatus according to claim 5, wherein said quantizing means quantizes an image signal obtained upon reading of an original image.

8. An apparatus according to claim 5, further comprising means for displaying the image density set by said setting means.

9. An image processing apparatus operable in either a first processing mode for reversing a density level of the image and outputting a reversed image, or a second processing mode for outputting the image without reversing the level thereof, comprising:
   means for setting a desired image density;
   means for selecting one of the first and second processing modes;
   means for correcting an input image signal according to a processing mode selected by said selecting means so as to obtain an image output of a density set by said setting means in both the first and second modes; and means for processing an image signal corrected by said correcting means according to the selected processing mode, said processing means being adapted to invert the corrected image signal and output an inverted corrected image signal in the first processing mode, and to output the corrected image signal without inversion in the second processing mode.

10. An apparatus according to claim 9, wherein said correcting means corrects an image signal obtained by reading an original image.

11. An apparatus according to claim 9, wherein said correcting means comprises means for quantizing an input image signal and causes said quantizing means to perform different quantization operations according to the selected processing mode.

12. An apparatus according to claim 9, further comprising means for displaying the image density set by said setting means.

13. An image processing apparatus comprising:
means for setting a desired image density;
means for quantizing an image signal with a threshold value corresponding to an image density set by said setting means;
means for displaying the image density set by said setting means;
means for processing an image signal quantized by said quantizing means, said processing means being operable in either a first processing mode for reversing a density level of the image and outputting a reversed image, or a second processing mode for outputting the image without reversing the level thereof;
means for selecting one of the first and second processing modes; and
control means for holding the threshold value of said quantizing means and updating display of said display means to a given mode after mode selection when switching between the first and second processing modes occurs.

14. An apparatus according to claim 13, wherein said quantizing means quantizes an image signal obtained upon reading of an original image.

15. An image processing apparatus operable in either a first processing mode for reversing a density level of the image and outputting a reversed image, or a second processing mode for outputting the image without reversing the level thereof, comprising:
means for setting a desired image density;
means for displaying the image density set by said setting means;
means for selecting one of the first and second processing modes;
means for processing an input image signal according to a processing mode selected by said selecting means; and
means for updating display of said display means to a given mode after mode selection when switching between the first and second processing modes occurs.

16. An apparatus according to claim 15, wherein said processing means processes an image signal obtained by reading an original image.

17. An apparatus according to claim 15, wherein said processing means comprises means for quantizing an input image signal.

* * * * *